United States Patent
Yomogida et al.

(10) Patent No.: US 7,021,045 B2
(45) Date of Patent: Apr. 4, 2006

(54) FUEL INJECTION CONTROL DEVICE

(75) Inventors: Koichiro Yomogida, Fujisawa (JP); Akira Hirata, Fujisawa (JP); Futoshi Nakano, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 82 days.

(21) Appl. No.: 10/721,133

(22) Filed: Nov. 25, 2003

(65) Prior Publication Data

US 2004/0103647 A1 Jun. 3, 2004

(30) Foreign Application Priority Data

Nov. 28, 2002 (JP) ............................. 2002-345644

(51) Int. Cl.
*F01N 3/00* (2006.01)

(52) U.S. Cl. ............................. 60/285; 60/284; 60/286; 123/299; 123/305

(58) Field of Classification Search ................ 60/284, 60/285, 286, 295; 123/299, 305
See application file for complete search history.

(56) References Cited

U.S. PATENT DOCUMENTS

| 4,719,751 | A | 1/1988 | Kume et al. ............... 60/285 |
| 5,050,551 | A | 9/1991 | Morikawa .................. 123/305 |
| 6,345,499 | B1 * | 2/2002 | Nishimura et al. ........... 60/277 |
| 6,378,297 | B1 * | 4/2002 | Ito et al. ...................... 60/284 |
| 6,560,960 | B1 * | 5/2003 | Nishimura et al. ........... 60/284 |
| 6,725,649 | B1 * | 4/2004 | Yamashita et al. ........... 60/284 |
| 6,851,258 | B1 * | 2/2005 | Kawashima et al. ......... 60/311 |
| 6,865,880 | B1 * | 3/2005 | Iihoshi et al. ................ 60/285 |

FOREIGN PATENT DOCUMENTS

| EP | 1 418 324 A2 | 11/2003 |
| JP | 10-252543 | 9/1998 |
| JP | 10-288067 | 10/1998 |
| JP | 10-081992 | 3/1999 |
| WO | WO 01/27455 A1 | 4/2001 |
| WO | WO 02/066813 A1 | 8/2002 |

OTHER PUBLICATIONS

Copy of EP Search Report for Serial No. EP 03 02 6837 dated May 4, 2005.

* cited by examiner

*Primary Examiner*—Binh Q. Tran
(74) *Attorney, Agent, or Firm*—McCormick, Paulding & Huber LLP

(57) ABSTRACT

A fuel injection control device includes an exhaust purification device for purifying an exhaust gas by catalytic action, an exhaust gas-temperature detection unit for detecting exhaust gas temperature, and a determination unit for determining the amount of the basic fuel injection and basic fuel injection timing from the operational status of a combustion engine, and a control unit for controlling the amount of the fuel injection and fuel injection timing. The control unit retards the fuel injection timing from the basic fuel injection timing when the exhaust gas temperature is lower than the temperature required for the catalytic activation of the exhaust purification device. The control unit also increases the amount of the fuel injection compared to the amount of the basic fuel injection to compensate for the loss of the torque output caused by the retarded fuel injection timing.

3 Claims, 5 Drawing Sheets

FUEL INJECTION CONTROL DEVICE

CROSS-REFERENCE TO RELATED APPLICATION

Applicants hereby claims foreign priority benefits under U.S.C. § 119 of Japanese Patent Application No. 2002-345644, filed on Nov. 28, 2002, and the content of which is herein incorporated by reference.

BACKGROUND OF THE INVENTION

1. Field of the Invention

The present invention relates to a fuel injection control device of a diesel engine equipped with an exhaust purification device.

2. Description of the Related Art

It is important for a diesel engine to decrease such things as particulate matter (hereinafter referred to as PM), nitrogen oxide (NOx) and hydrocarbon (HC) contained in an exhaust gas. Various types of exhaust purification devices have been proposed in order to decrease such substances.

For example, there is known a so-called continuation reproduction type DPF (diesel particulate filter) in which a catalyst such as zeolite is used with a monolith honeycomb filter of a wall flow type made from ceramics or a fiber type filter made from ceramics and metals. In the DPF, PM in the exhaust gas is collected by the filter, and the collected PM is burned (oxidized) and removed by catalytic action.

However, these exhaust purification devices with such continuation reproduction type DPF which utilize catalytic action do not provide satisfying results in the exhaust gas purification unless the exhaust gas temperature is at activation temperature (for example; 250 degrees C. or more) for the catalyst.

Accordingly, if the exhaust gas temperature is low e.g., when an engine has just started and a vehicle is running with a light load, there is a possibility that the exhaust gas would not be purified by the exhaust purification device.

When the exhaust gas temperature is below the activation temperature of the catalyst provided in an exhaust purification device, an engine intake throttle valve is narrowed to decrease the amount of air supplied to the engine, thereby increasing an air-fuel ratio to raise exhaust gas temperature. However, by doing this, the amount of exhaust gas itself is reduced. This means that the elevated exhaust gas temperature does not contribute to the exhaust gas purification very much.

Hence, it has been proposed to retard the fuel injection timing as an alternative method of raising the exhaust gas temperature. By doing so, exhaust gas temperature can be greatly raised.

However, when the fuel injection timing is retarded, there is a problem that engine torque output decreases.

This will be described in reference to FIG. 5 of the accompanying drawings.

In FIG. 5, the amount of fuel injection is indicated by the horizontal axis and the torque output of the engine is indicated by the vertical axis. The line A shows a torque output when the fuel injection timing is conducted at normal timing. The line B shows a torque output when the fuel injection timing is retarded for a predetermined period.

As understood from FIG. 5, when the same amount of the fuel injection is supplied, the torque output obtained when the fuel injection is retarded is smaller than the torque output obtained when the fuel injection is performed at the normal timing. For example, if the fuel injection timing is set slower from the state indicated by the point C in FIG. 5 in order to raise exhaust gas temperature, the torque output would decrease from P1 to P2, and this may cause a driver to feel a shock.

SUMMARY OF THE INVENTION

An object of the present invention is to provide a fuel injection control device which is able to increase the exhaust gas temperature, to maintain the purification of the exhaust purification device, and not to cause a torque output fluctuation when the exhaust gas temperature is raised.

A fuel injection control device of an internal combustion engine according to one aspect of the present invention includes an exhaust purification device disposed in an exhaust passage of an internal combustion engine for purifying an exhaust gas by the catalytic action, an exhaust gas temperature detector for detecting or computing an exhaust gas temperature which passes through the exhaust purification device, a determination unit for determining the amount and timing of the fuel injection based on an operational status, such as the load condition and rotational speed, of the internal combustion engine, and a controller for controlling actual amount and timing of the fuel injection by a fuel injector in the internal combustion engine. When the exhaust gas temperature detected or computed by the exhaust gas temperature detector is at or above the catalytic activation temperature of the exhaust purification device, the controller controls the amount and timing of the fuel injection in order to make them respectively equal to the amount and the timing of basic fuel injection. On the other hand, when the exhaust gas temperature detected or computed by the exhaust gas temperature detector is lower than the catalytic activation temperature of the exhaust purification device, the controller raises the exhaust gas temperature by retarding the fuel injection timing from the basic fuel injection timing and also increases the amount of the fuel injection compared to the amount of the basic fuel injection in order to compensate the torque output decrement of the internal combustion engine which is caused by the retarded fuel injection timing.

When the fuel injection timing is retarded in order to raise the exhaust gas temperature, the amount of fuel injection is increased to compensate torque output fluctuation caused by the retarded fuel injection timing. As a result, the same output of torque is obtained before and after the retardation of the fuel injection timing, thereby eliminating the possibility of the driver's feeling any shock.

The controller may determine the retardation period based on the load condition and/or the rotational speed of the internal combustion engine and may also determine the amount of fuel injection which is increased compared to the basic fuel injection amount in accordance with the load condition and/or the rotational speed.

The retarded timing and increased amount of the fuel injection which depend on the load condition and the rotational speed of the internal combustion engine, may be respectively stored into the control means in the form of maps, and the controller may determine the actual timing and the actual amount of the fuel injection in reference to these maps.

DETAILED DESCRIPTION OF THE INVENTION

Figure 1:
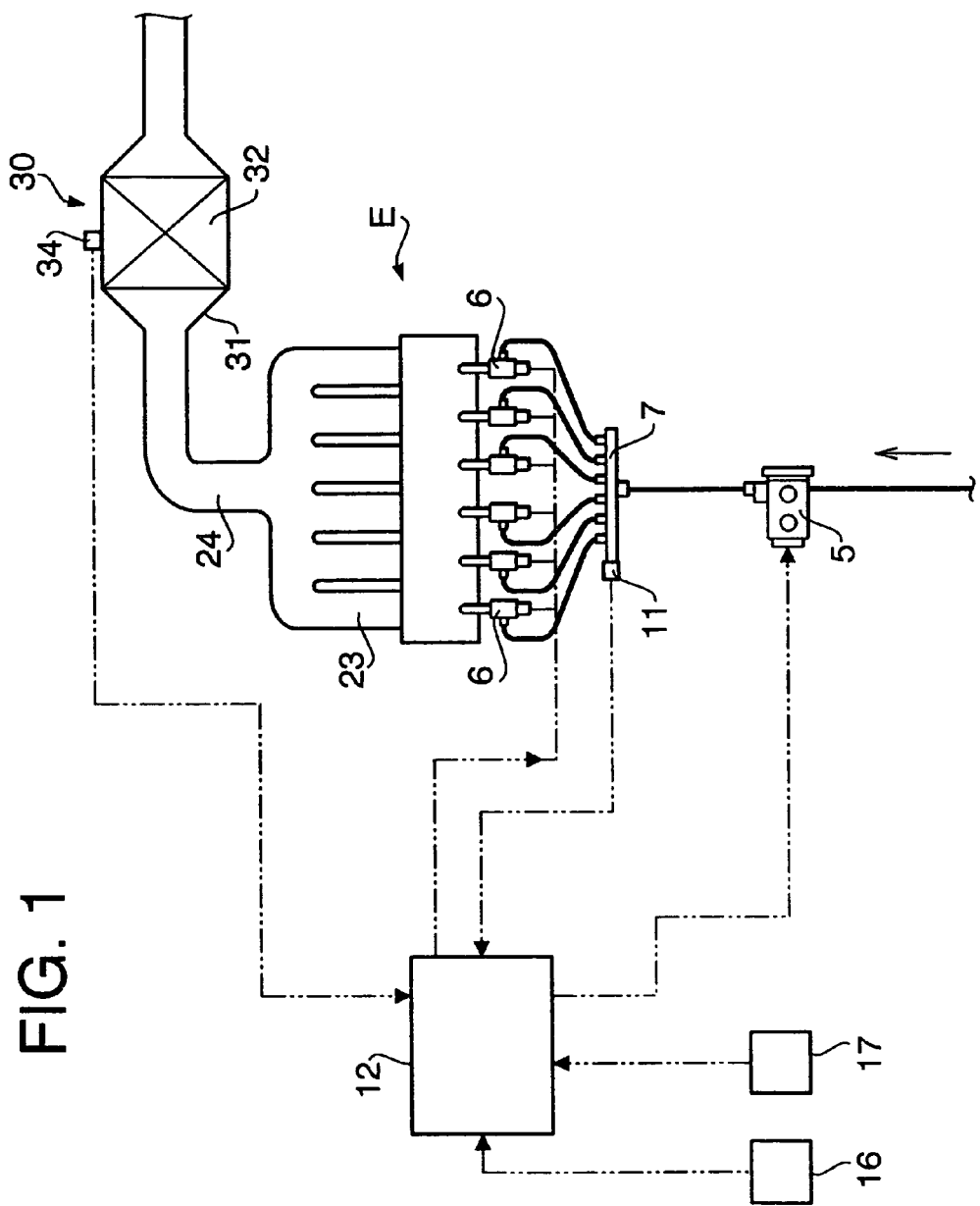
FIG. 1 is a schematic diagram of the fuel injection control device according to one embodiment of this invention together with an engine and associated parts.

Referring to FIG. 1, an embodiment of a fuel injection control device will be described.

The internal combustion engine E which employs a fuel injection control device of the embodiment is a 6-cylinder diesel engine equipped with a common rail fuel injection device.

The fuel injection control device of this embodiment includes a supply pump 5 for supplying fuel from a fuel tank (not illustrated) to a common rail 7, and multiple fuel injectors 6 which are connected to the common-rail 7 for injecting fuel into a combustion chamber of each engine E cylinder.

The supply pump 5 is a pressure regulation pump which can adjust delivery pressure, and this delivery pressure is controlled by a controller (control means) 12.

A pressure sensor 11 is provided in the common rail 7, the fuel pressure in the common-rail 7 is detected by the pressure sensor 11, and the detected value is input into the controller 12.

Each fuel injector 6 is connected with the controller 12 and also controlled (operated) by a driving signal transmitted from the controller 12. A plurality of detection means such as an engine rotation sensor 16 for detecting the rotational speed of the engine E and an accelerator opening degree sensor 17 for detecting the accelerator opening degree (engine load) of a vehicle are connected to the controller 12. The detection values obtained by the detection means 16 and 17 are inputted into the controller 12. The controller 12 determines the amount of the basic fuel injection and basic fuel injection timing from a basic fuel injection map inputted beforehand based on the actual engine rotational speed detected by the engine rotation sensor 16 and the actual accelerator opening degree detected by the accelerator opening degree sensor 17. The controller 12 normally outputs the driving signal to each fuel injector 6 according to the amount of the basic fuel injection and the basic fuel injection timing.

Exhaust ports of all the cylinders in engine E are connected to an exhaust pipe 24 through an exhaust manifold 23. Also, an exhaust purification device 30 for purifying exhaust gas is provided on the exhaust pipe 24. The exhaust purification device 30 of this embodiment is known as so-called DPF having a casing 31 connected to the collecting exhaust pipe 24 and a catalyst filter 32 disposed in the casing 31 for collecting PM in exhaust gas in order to burn (oxidize) and remove the PM. For example, catalyst such as zeolite can be applied onto a monolith honeycomb filter of a wall flow type made from ceramics or a fiber type filter made from ceramics or metal, etc, and these filters can be employed as the catalyst filter 32.

When the exhaust gas passes through the inside of the exhaust purification device 30, the PM in the exhaust gas is collected by the catalyst filer and the collected PM is oxidized and removed through the catalytic action.

The exhaust emission control 30 has a sensor (exhaust gas temperature detection means) 34 for detecting the temperature of the exhaust gas which passes through the exhaust purification device 30, and the detected amount (value) from the sensor 34 is transmitted to the controller 12.

The intake pipe of engine E is omitted in FIG. 1.

As described in the section of "the description of the related art", the exhaust purification device 30 using catalytic action does not provide sufficient exhaust gas purification unless the temperature of the exhaust gas which passes the exhaust purification device 30 (hereinafter referred to as exhaust gas temperature) is at or above the activation temperature (for example, 250 degrees C.) of the catalyst. When the exhaust gas temperature detected by the sensor 34 is lower than the temperature required for catalyst action, the fuel injection timing is retarded from the basic fuel-injection timing in order to raise the exhaust gas temperature. The present invention increases the amount of the fuel injection compared to the amount of the basic fuel injection in order to compensate for the decrease of the torque output of the engine E caused by the retarded fuel injection timing when the exhaust gas temperature rise control is performed.

Hereafter, this point will be described in reference to FIG. 2 and FIG. 3.

Figure 2:
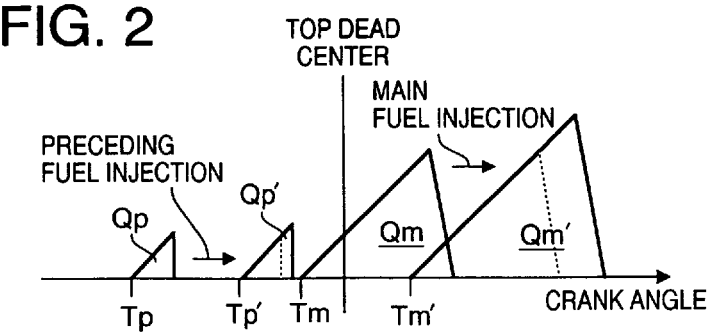
FIG. 2 is a diagram showing injection timings and fuel injection amounts.

FIG. 2 is a diagram showing the time and the amount of fuel injection. FIG. 2 shows an example which performs dual injections including a preceding injection performed prior to the main injection and the main injection in one cycle.

Figure 3A:
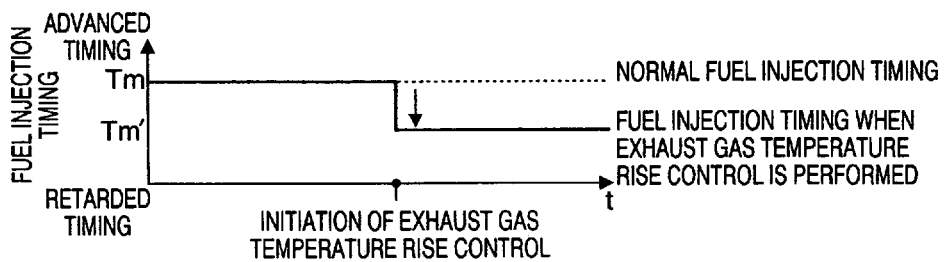
FIG. 3a is a chart showing main injection timing before and after performing the exhaust gas temperature rise control.
Figure 3B:
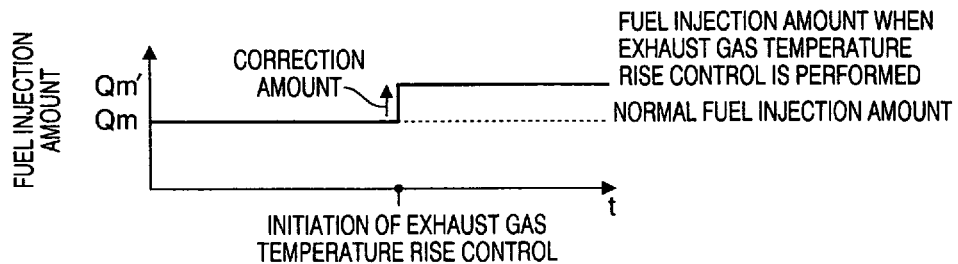
FIG. 3b is a chart showing the main injection amount before and after performing the exhaust gas temperature rise control.
Figure 3C:
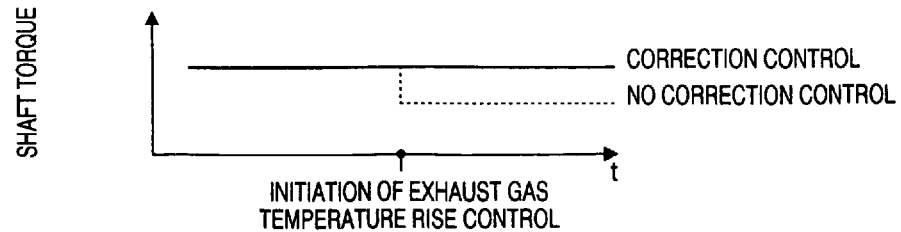
FIG. 3c is a chart showing a crank shaft torque output of the engine before and after performing the exhaust gas temperature rise control.

FIG. 3a shows the timing of the main injection before and after performing the exhaust gas temperature rise control, FIG. 3b shows the amount of the main fuel injection before and after performing the exhaust gas temperature rise control, and FIG. 3c shows the torque output of the engine E before and after performing the exhaust gas temperature rise control.

When the exhaust gas temperature detected by the sensor 34 is at or above the catalytic activation temperature required by the catalyst filter 32 provided in the exhaust purification device 30, the controller 12 determines basic fuel injection timing and the basic amount of fuel injected at both the preceding and main fuel injection from the basic fuel injection map, and then transmits driving signals to fuel injectors 6. Therefore, the fuel injection timing Tp and the amount of fuel injection Qp (equivalent to the triangle area shown in FIG. 2) of the preceding fuel injection supplied by fuel injectors 6, and fuel-injection timing Tm and the amount of the fuel injection Qm of the main fuel injection, are respectively equivalent to the basic fuel injection timing and the basic fuel injection amount.

On the other hand, when the exhaust gas temperature is relatively low, such as when the engine E has just started or when the vehicle is driven with a light load, and the exhaust gas temperature detected by the sensor 34 is lower than the activation temperature of the catalyst in the catalyst filter 32 of the exhaust purification device 30, the controller 12 performs the exhaust gas temperature rise control. That is, while determining the basic fuel injection timing of the main fuel injection and the preceding fuel injection in accordance with the basic fuel injection map based on the actual engine rotational speed detected by the engine rotation sensor 16 and the actual accelerator opening degree detected by the accelerator opening sensor 17, the retardation period of the fuel injection timing of the main injection and the preceding fuel injection is also determined in accordance with retardation period map which will be described later. The retarded fuel injection timing for the preceding fuel injection and the main fuel injection are determined by adding the retardation amount to the basic fuel injection timing. Moreover, the increased amount of the fuel injection of the main fuel injection and the preceding fuel injection is determined in reference to the increased amount of the fuel injection map which will be described later. Although this process will be explained in greater detail later, the increased amounts of the fuel injection of the main fuel injection and the preceding fuel injection determined by reference to the increased fuel injection amount map are larger than the amount of the basic fuel injection determined by reference to the basic fuel injection map under the same engine rotational speed and the accelerator opening degree. The controller 12 than outputs a driving signal to each fuel injector 6 based on the retarded fuel injection timing and the increased amount of the fuel injection.

Accordingly, the fuel injection timing Tp' of the preceding fuel injection and fuel injection timing Tm' of the main fuel injection supplied by the fuel injector 6 are respectively retarded from the basic fuel injection timing of preceding fuel injection and the main fuel injection, and also the amount of the fuel injection Qp' of the preceding fuel injection and the amount of the main fuel injection Qm' are respectively increased compared to the basic amount of the fuel injection of the preceding fuel injection and the main fuel injection.

In addition, an example in which both preceding and main fuel injection timing are retarded from the basic fuel injection timing, but the amounts of the fuel injections are the same as the amounts of the basic fuel injection, is shown by the broken line in FIG. 2.

Thus, the fuel injection control device of the present invention increases the amount of the fuel injection in order to compensate the drop of torque output of the engine E caused by the retarded fuel injection timing. As a result, as shown in FIG. 3c, substantially the same torque output is obtained before and after performing the exhaust gas temperature rise control. Therefore, there is no possibility of causing a driver to feel any driving discomfort.

Next, the determination method of the retardation period of the fuel injection timing when the exhaust gas temperature rise control is performed will be described.

First, appropriate retardation periods to be given to various basic fuel injection timing are prepared by experiments and tests beforehand based on various rotational speeds and the loads (mainly determined by an accelerator opening degrees) of the engine E, and these retardation periods are inputted into the controller 12 in the form of an retardation period map beforehand. When the exhaust gas temperature rise control is performed, the retardation period is determined by the retardation period map from the actual engine rotational speed detected by the engine rotational sensor 16 and the actual accelerator opening degree detected by the accelerator opening degree sensor 17. In the meantime, basic fuel injection is determined by the basic fuel injection timing map. Then, the fuel injection timing is determined by adding the retardation period to the basic fuel injection timing.

Next, the method of determining the correction amount of the fuel injection accompanied by retarding the fuel injection timing will be explained.

Appropriately increased amounts of the fuel injection which are greater than the corresponding basic amounts of the fuel injection for the various rotational speed and loads of the engine E are obtained from experiment results, and the increased amounts of the fuel injection are inputted into the controller 12 in the form of an increased fuel injection map beforehand. When the exhaust gas temperature rise control is performed, the increased amount of the fuel injection is determined by the increased fuel injection map based on the actual engine rotational speed detected by the engine rotational sensor 16 and the actual accelerator opening degree detected by the engine accelerator opening degree sensor 17.

Figure 4:
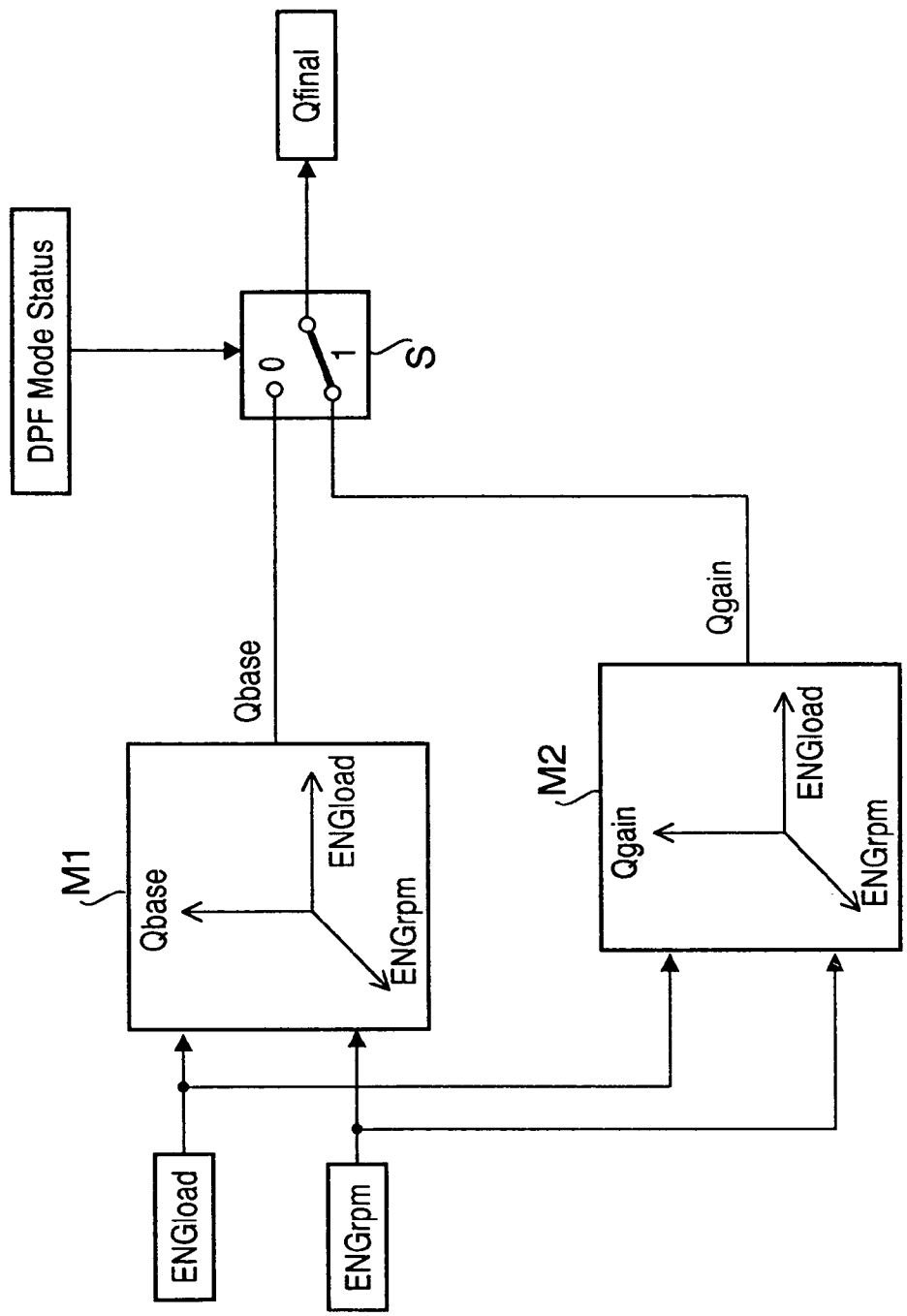
FIG. 4 is a block diagram for determining the amount of fuel injection.

The block diagram for determining the amount of the fuel injection is shown in FIG. 4.

As shown in FIG. 4, the basic amount of the fuel injection Qbase is determined by the basic fuel injection map M1 based on the engine rotational speed ENGrpm inputted from the engine rotation sensor 16 and engine load (accelerator opening degree) ENGload inputted from the accelerator opening degree sensor 17. Likewise, the increased amount of the fuel injection Qgain is determined by the increased fuel injection map M2 based on the engine rotational speed ENGrpm and engine load ENGload. When the exhaust gas temperature rise control mode (DPF Mode) is OFF, a switch S is connected to 0, and the basic amount of the fuel injection Qbase is used as the final fuel injection amount Qfinal which is outputted from the controller 12 to a fuel injector 6 as a final value. On the other hand, when the exhaust gas temperature rise control mode (DPF Mode) is ON, the switch S is switched to 1, and the increased amount of the fuel injection Qgain is determined as the final amount of fuel injection Qfinal.

It should be remembered here that the increased amount of the fuel injection is set to a value that does not cause the torque output fluctuation in the engine E before and after performing the exhaust gas temperature rise control.

Figure 5:
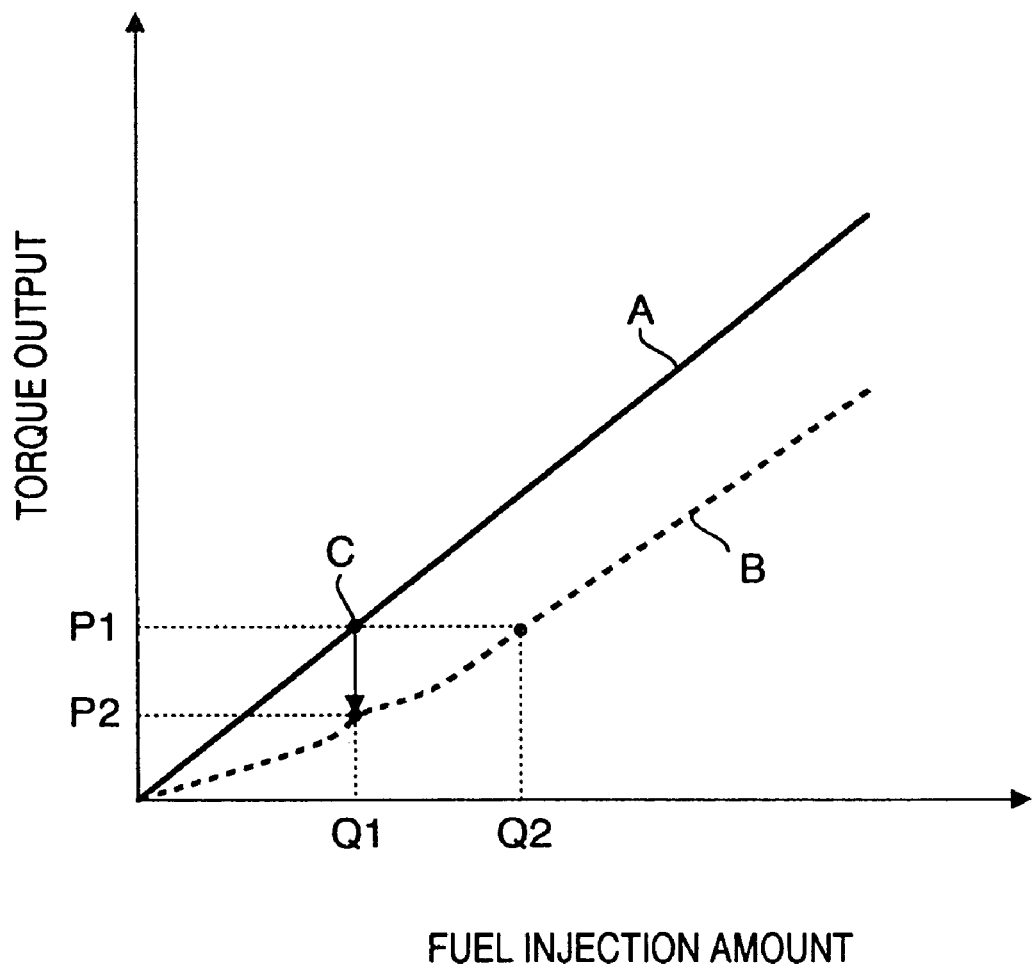
FIG. 5 is a diagram showing a relationship between the amount of the fuel injection and a torque output of the engine.

An example will be describe in reference to FIG. 5. In FIG. 5, the horizontal axis shows a total amount of the fuel injection obtained by adding the amount of the main fuel injection to the amount of the preceding fuel injection, and the vertical axis shows the torque output of the crankshaft of the engine E. The line A shows the torque output when the fuel injection is carried out at the normal fuel injection timing (the basic fuel injection timing), and the line B shows the torque output when the fuel injection timing is retarded for a predetermined period from the basic fuel injection timing.

It is supposed that a vehicle is in a condition C in which the exhaust gas temperature rise control (retardation of the fuel injection timing) is not performed. Under this condition, the amount of the fuel injection is Q1, and the torque output of the engine E is P1. When fuel injection timing is retarded in order to raise the exhaust gas temperature, the amount of the fuel injection is increased up to the point Q2 where the torque output obtained is equal to the torque output P1 of the normal fuel injection timing. That is, the added amount of fuel is obtained from the equation of Q2−Q1(subtracting Q1 from Q2). By means of this, the occurrence of the torque fluctuation caused before and after performing exhaust gas temperature rise control can be avoided. The values of the increased amount of the fuel injection Qgain with which a torque output fluctuation is not generated when exhaust gas temperature rise control is performed, are prepared by testing beforehand under various operational conditions, and the increased fuel injection map M2 as shown in FIG. 4 is prepared.

The present invention is not only limited to the above-described embodiments and examples, and various changes and modifications may be made without departing from the spirit and scope of the invention.

Figure 6:
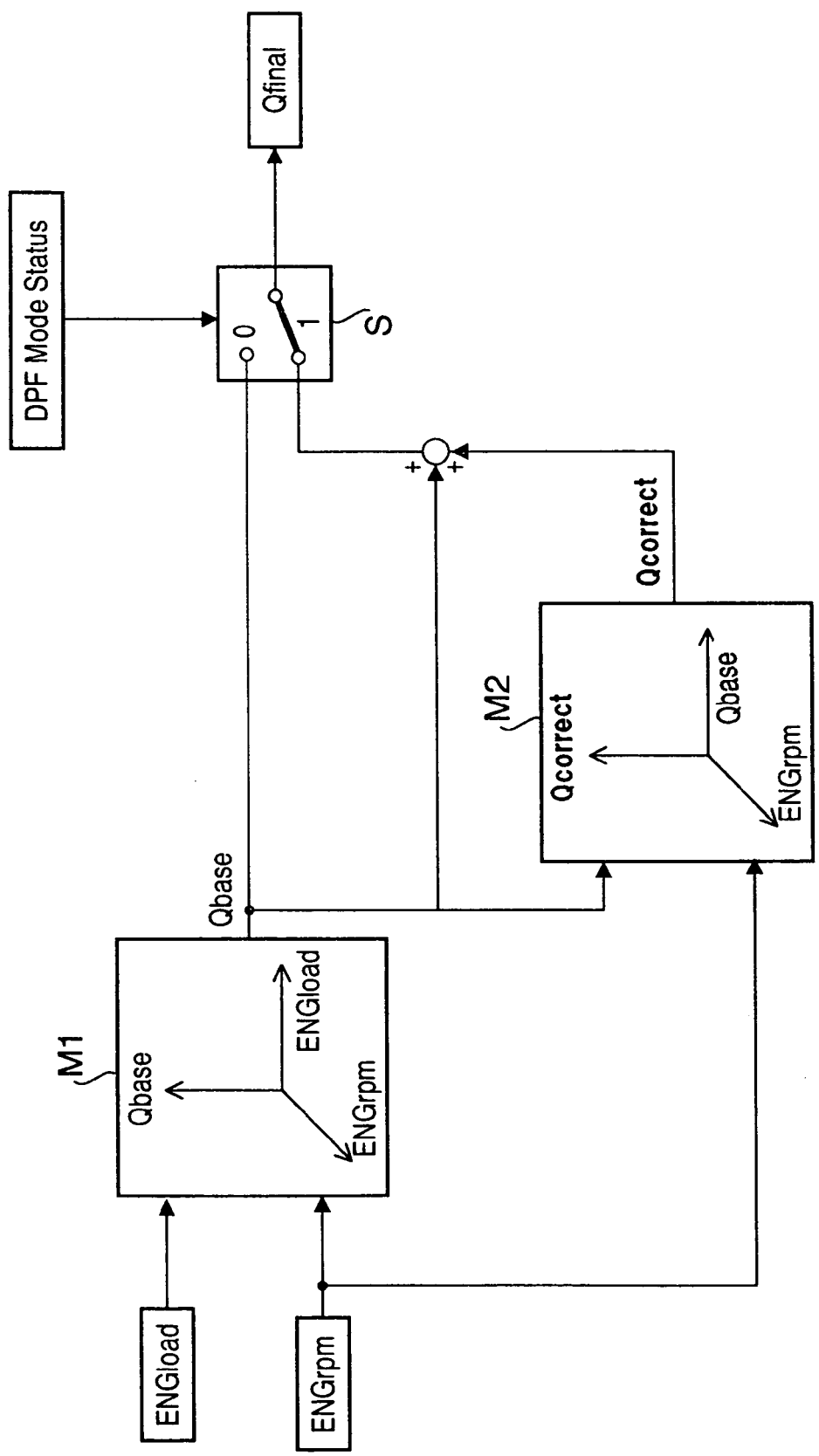
FIG. 6 is a block diagram showing another embodiment for determining fuel injection amount.

For example, the amount of the fuel injection may be determined with reference to the diagram as shown in FIG. 6. In this embodiment, the correction amount map M3 which stores the appropriate correction amount Qcorrect determined based on the basic amount of the fuel injection Qbase and the engine rotational speed ENGrpm is prepared. The controller 12 determines the amount of the basic fuel injection Qbase from the basic fuel-injection map M1 basicd on the engine rotational speed ENGrpm inputted from the engine rotation sensor 16, and engine load ENGload inputted from the accelerator opening sensor 17, and determines the correction amount Qcorrect from the correction amount map M3 based on the basic amount of the fuel injection Qbase and engine rotational speed ENGrpm. When the exhaust gas temperature rise control mode (DPF Mode) is OFF, the switch S is connected to 0, and the basic amount of the fuel injection Qbase is determined as the final amount of the fuel injection Qfinal. On the other hand, when the exhaust gas temperature rise control mode (DPF Mode) is ON, the switch S is switched to 1, and the sum of the correction amount Qcorrect and the basic amount of the fuel injection Qbase (equivalent to the increased amount of the fuel injection Qgain in the embodiment of FIG. 4) is determined as the final amount of the fuel injection Qfinal. It should be noted that the correction amount Qcorrect may be adjusted with reference to water temperature, intake air temperature, atmospheric pressure, etc.

Although the retardation period of the fuel injection timing is determined based on the engine rotational speed and the engine load in the foregoing description, it may be determined based on the difference between the actual exhaust gas temperature detected by the sensor 34 and the catalyst activation temperature of the exhaust purification device 30.

Also, in the embodiment shown in FIG. 2, the preceding fuel injection timing slower and main fuel injection timing are retarded and the preceding fuel injection amount and the main fuel injection amount are increased. However, the present invention is not limited in this regard. Setting the timing slower and correcting the injection amount only regarding the main fuel injection may be performed. Moreover, the fuel injection system of the present invention is not limited to a duel injection type, but can be applied to a single injection type which performs only a main fuel injection and a multi-injection type which performs more than one auxiliary fuel injection.

Use of the sensor 34 is not required to detect the temperature of the exhaust gas which passes through the exhaust purification device 30. For instance, it is possible to calculate the temperature from a rotational speed, load condition, etc. of engine E.

Furthermore, the exhaust purification device is not limited to the above mentioned DPF type. Any types for exhaust purification device can be employed as long as it utilizes the catalytic to oxidize and remove NOx.

In summary, the present invention displays excellent effects by which the exhaust gas temperature can be raised in order to maintain the purification of the exhaust purification device and a fluctuation of torque output does not occur when the exhaust gas temperature is raised.

What is claimed is:

1. A fuel injection control device of an internal combustion engine comprising:
   an exhaust purification device located at an exhaust passage of an internal combustion engine for purifying an exhaust gas by catalytic action;
   exhaust gas temperature determination means for detecting or computing temperature of the exhaust gas passing through the exhaust purification device;
   determining means for determining an amount and a timing of basic fuel injection based on operational status such as a load and a rotational speed of the internal combustion engine; and
   control means for controlling an amount and a timing of a fuel injection by a fuel injector of the internal combustion engine, wherein the control means controls the amount and the timing of the fuel injection to make them respectively equal to the amount of the basic fuel injection and the timing of the basic fuel injection timing when the detected or computed exhaust gas temperature is at or above a catalytic activation temperature of the exhaust purification device, and the control means raises the exhaust gas temperature by retarding the timing of the fuel injection timing from the timing of the basic fuel injection, and also increases the amount of the fuel injection from the amount of the basic fuel injection in order to compensate for a drop in a torque output of the internal combustion engine which is caused by retarding the timing of the fuel injection when the detected or computed exhaust gas temperature is lower than the catalytic activation temperature of the exhaust purification device so that the torque output obtained is substantially equal to the torque output of the normal fuel injection timing and the values of the increased amounts of the fuel injections are stored into the control means in the form of maps.

2. A fuel injection control device according to claim 1, wherein the control means determines retardation period from the timing of the basic fuel injection based on the load and the rotational speed of the internal combustion engine and determines the increased amount of the fuel injection based on the load and the rotational speed of the internal combustion engine.

3. A fuel injection control device according to claim 2, wherein a relationship between the retardation period and the load and the rotational speed of the internal combustion engine and the relationship between fuel injection and the load and the rotational speed of the internal combustion engine are stored into the control means in the form of maps, and the control means controls the timing of the fuel injection and the increased amount of fuel injection according to the maps.

* * * * *